United States Patent
Toyoda

(10) Patent No.: US 10,827,119 B2
(45) Date of Patent: Nov. 3, 2020

(54) IMAGE CAPTURE APPARATUS AND CONTROL METHOD

(71) Applicant: CANON KABUSHIKI KAISHA, Tokyo (JP)

(72) Inventor: Yumi Toyoda, Sakuragawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/184,380

(22) Filed: Nov. 8, 2018

(65) Prior Publication Data

US 2019/0149743 A1 May 16, 2019

(30) Foreign Application Priority Data

Nov. 15, 2017  (JP) ................. 2017-220072

(51) Int. Cl.
*H04N 5/232* (2006.01)
*H02J 7/00* (2006.01)

(52) U.S. Cl.
CPC ........ *H04N 5/232411* (2018.08); *H02J 7/007* (2013.01); *H04N 5/23245* (2013.01)

(58) Field of Classification Search
CPC ........... H04N 5/232411; H04N 5/23245; H02J 7/007
See application file for complete search history.

(56) References Cited

U.S. PATENT DOCUMENTS

| | | | | |
|---|---|---|---|---|
| 5,438,270 A | * | 8/1995 | Harper ................. | G01R 31/386 324/429 |
| 6,134,391 A | * | 10/2000 | Takahashi ............... | G03B 7/26 320/106 |
| 6,191,590 B1 | * | 2/2001 | Klutz ................. | G01R 31/3835 324/428 |
| 6,421,504 B1 | | 7/2002 | Saito et al. | |
| 2003/0146733 A1 | * | 8/2003 | Miller ................... | H02J 7/0008 320/106 |
| 2005/0062878 A1 | * | 3/2005 | Ogawa ................... | H04N 5/232 348/372 |
| 2016/0295113 A1 | * | 10/2016 | Iqbal ................. | H04N 5/23293 |

FOREIGN PATENT DOCUMENTS

| | | |
|---|---|---|
| JP | 2000-341581 A | 12/2000 |
| JP | 2000-354191 A | 12/2000 |
| JP | 2001-339630 A | 12/2001 |
| JP | 2006-90735 A | 4/2006 |
| JP | 2008-067523 A | 3/2008 |
| JP | 2017-073952 A | 4/2017 |

* cited by examiner

*Primary Examiner* — Timothy J Henn
(74) *Attorney, Agent, or Firm* — Canon U.S.A., Inc. IP Division

(57) ABSTRACT

An image capture apparatus includes a charge control unit that stops charging a battery with power supplied from a power supply apparatus, a voltage detecting unit that detects a voltage of the battery in a state where the charging of the battery is stopped, and a determining unit that determines whether the image capture apparatus is operable based on the detected voltage of the battery.

17 Claims, 10 Drawing Sheets

FIG.4

| OPERATING MODE | LOAD TEST COEFFICIENT |
|---|---|
| REPRODUCTION MODE | 150 |
| STILL IMAGE CAPTURE MODE | 200 |
| STILL IMAGE CONTINUOUS CAPTURE MODE | 260 |
| MOVING IMAGE CAPTURE MODE | 300 |
| PRINTER CONNECTION MODE | 220 |
| Wi-Fi CONNECTION MODE | 250 |

FIG.6

| OPERATING MODE | POWER CONSUMPTION [mW] |
|---|---|
| REPRODUCTION MODE | 1500 |
| STILL IMAGE CAPTURE MODE | 2000 |
| STILL IMAGE CONTINUOUS CAPTURE MODE | 2600 |
| MOVING IMAGE CAPTURE MODE | 3000 |
| PRINTER CONNECTION MODE | 2200 |
| Wi-Fi CONNECTION MODE | 2500 |

FIG.8

| OPERATING MODE | NECESSARY BATTERY CAPACITY [mAh] |
|---|---|
| REPRODUCTION MODE | 500 |
| STILL IMAGE CAPTURE MODE | 700 |
| STILL IMAGE CONTINUOUS CAPTURE MODE | 1100 |
| MOVING IMAGE CAPTURE MODE | 1300 |
| PRINTER CONNECTION MODE | 900 |
| Wi-Fi CONNECTION MODE | 1000 |

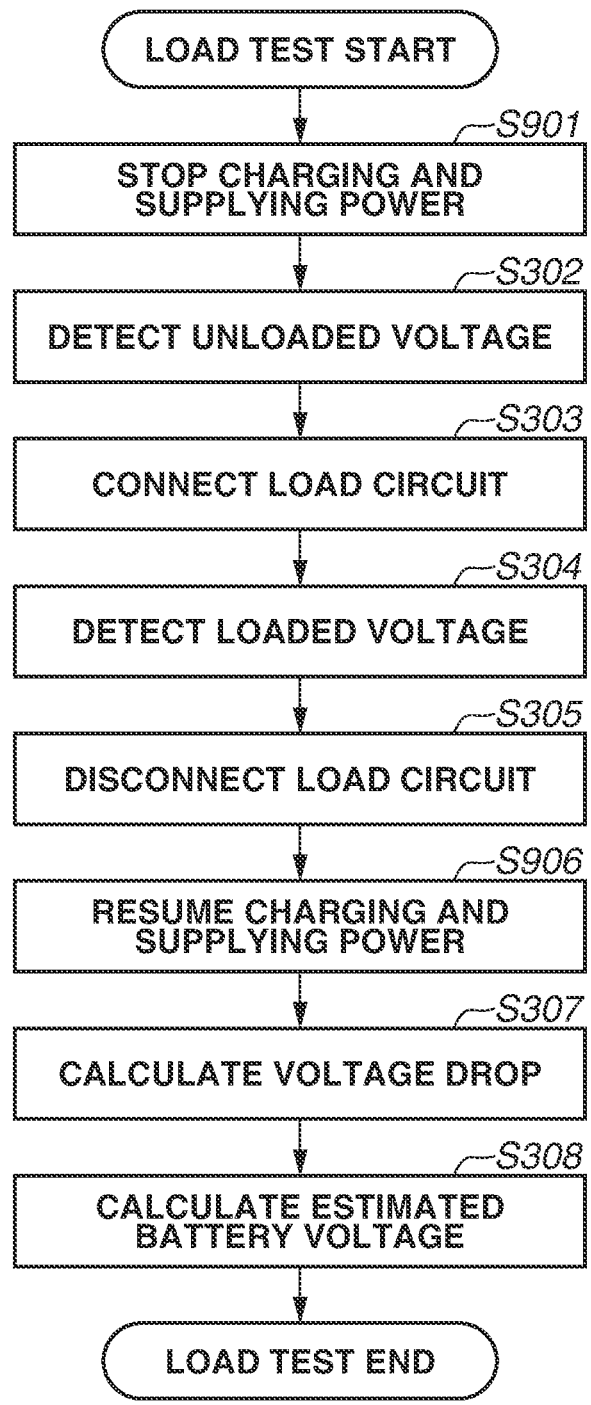

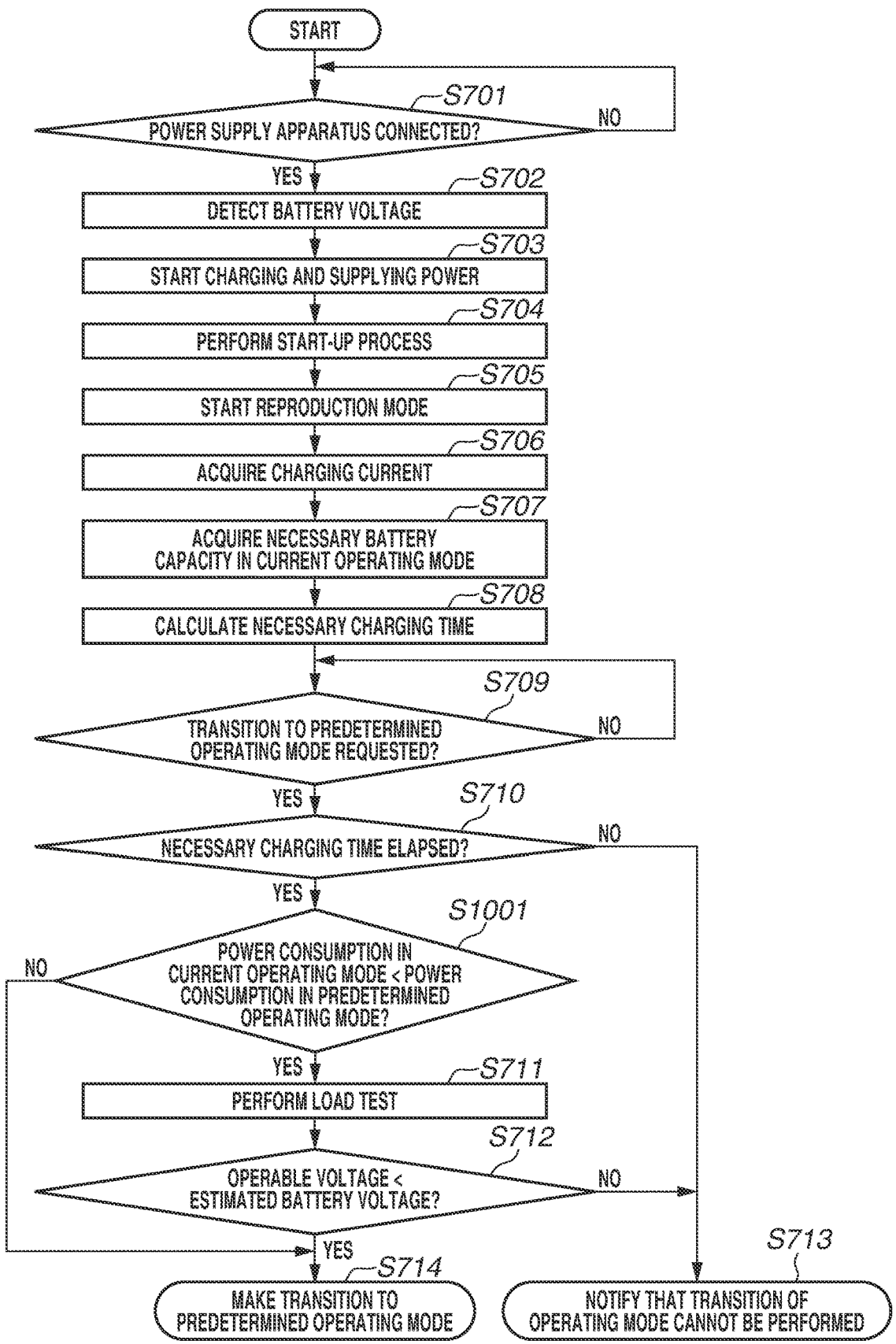

IMAGE CAPTURE APPARATUS AND CONTROL METHOD

BACKGROUND

Field

Aspects of the disclosure generally relate to an image capture apparatus that charges a battery and a method for controlling the image capture apparatus.

Description of the Related Art

In a case where a circuit consuming large power is operated in an image capture apparatus that is operated by power from a battery, the image capture apparatus may run out of power while the circuit is operating and become inoperable during the operation thereof. To solve such an issue, a method in which a voltage drop that can occur in a case where the circuit is operated is estimated and the operation is regulated in advance has been proposed. Japanese Patent Application Laid-Open No. 2006-90735 discusses a method in which, before such a circuit consuming large power is operated, a battery voltage under no load and the battery voltage under load are acquired and voltage drop that can occur in a case where a predetermined operation is performed is estimated.

In the method discussed in Japanese Patent Application Laid-Open No. 2006-90735, however, when the battery is connected to a battery charger, a charging voltage for charging the battery is added to the battery voltage, thus an accurate battery voltage is difficult to obtain. An electronic device cannot estimate a voltage drop that can occur in the case where the predetermined operation is performed with the current remaining amount of the battery, and the battery charger is suddenly disconnected, thereby causing interruption of the power supply. As a result, the electronic device stops the operation in a case where the image capture apparatus is inoperable only by power supplied from the battery.

SUMMARY

According to an aspect of the embodiments, an image capture apparatus and a method of controlling the image capture apparatus are improved.

According to an aspect of the embodiments, it is possible to reduce occurrence of a case where operation of the image capture apparatus is interrupted in the middle of the operation.

According to an aspect of the embodiments, an image capture apparatus includes a charge control unit that stops charging a battery with power supplied from a power supply apparatus, a voltage detecting unit that detects a voltage of the battery in a state where the charging of the battery is stopped, and a determining unit that determines whether the image capture apparatus is operable based on the detected voltage of the battery.

According to an aspect of the embodiments, there is provided a method that includes stopping charging a battery from a power supply apparatus, detecting a voltage of the battery in a state where the charging of the battery is stopped, and determining whether an image capture apparatus is operable based on the detected voltage of the battery.

According to an aspect of the embodiments, there is provided a non-transitory storage medium that stores a program causing a computer to execute a method. The method includes stopping charging a battery from a power supply apparatus, detecting a voltage of the battery in a state where the charging of the battery is stopped, and determining whether an image capture apparatus is operable based on the detected voltage of the battery.

Further aspects of the embodiments will become apparent from the following embodiments with reference to the attached drawings.

BRIEF DESCRIPTION OF THE DRAWINGS

FIG. 4 is a diagram illustrating an example of a correspondence relationship between operating modes and load test coefficients.

FIG. 6 is a diagram illustrating an example of correspondence relationship between operating modes and power consumptions.

FIG. 8 is a diagram illustrating an example of a correspondence relationship between operating modes and necessary battery capacities.

FIG. 9 is a flowchart illustrating the load test.

FIG. 10 is a flowchart illustrating an example of an operation performed by the image capture apparatus.

DESCRIPTION OF THE EMBODIMENTS

Exemplary embodiments, features, and aspects of the disclosure will be described below with reference to the drawings. However, aspects of the disclosure are not limited to the following embodiments.

Figure 1:
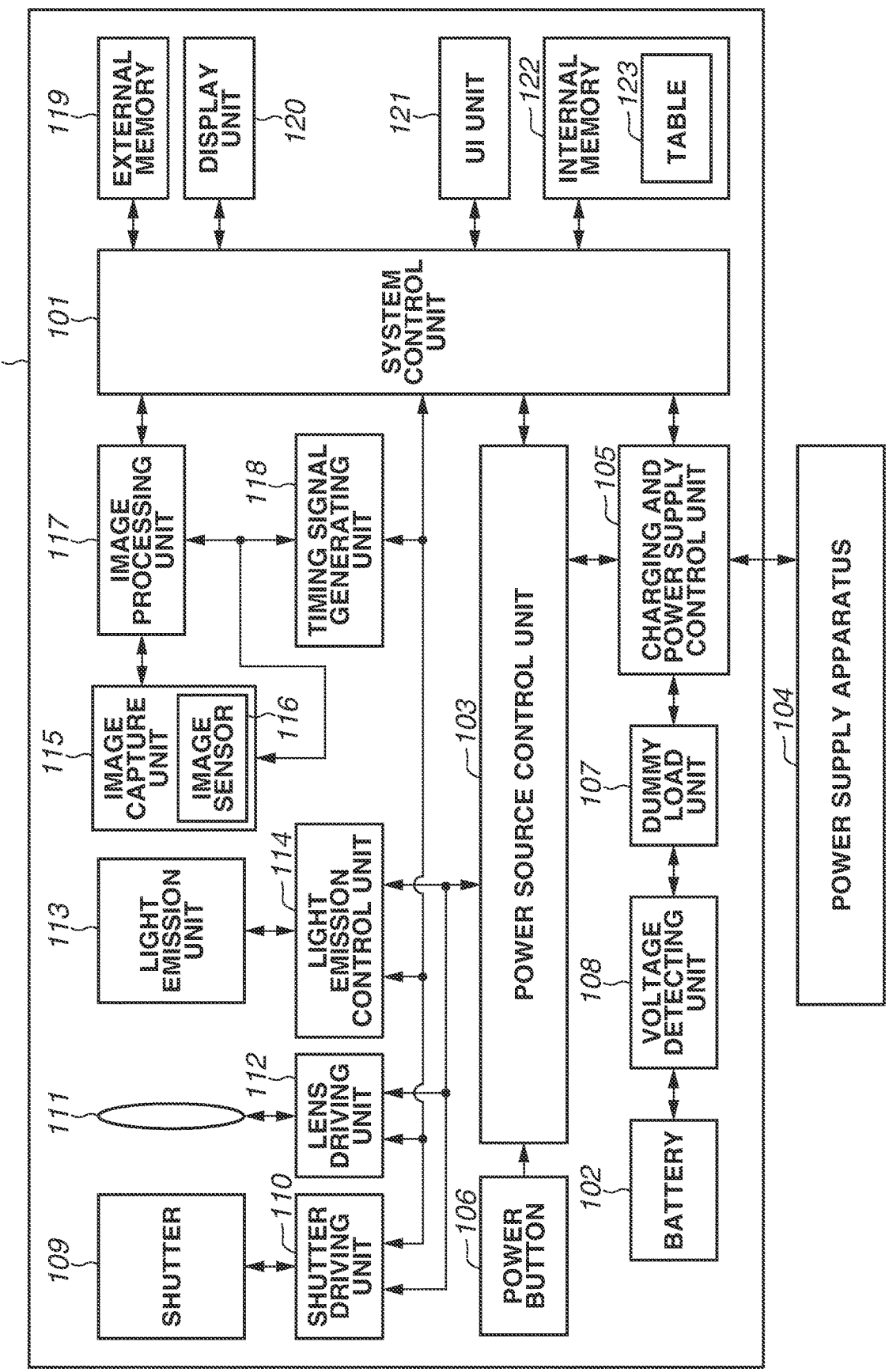
FIG. 1 is a block diagram illustrating an example of components of an image capture apparatus.

FIG. 1 is a block diagram illustrating an example of components of an image capture apparatus 100 according to a first exemplary embodiment. The image capture apparatus 100 is an apparatus that acts as a digital camera or a digital video camera. The image capture apparatus 100 can be a smartphone, a tablet, a camera for industrial or medical use, and the like.

A system control unit 101 controls each of the components of the image capture apparatus 100. A battery 102 is detachable from the image capture apparatus 100, and supplies power to the components of the image capture apparatus 100 via a power source control unit 103. The image capture apparatus 100 is operated by power supplied from the battery 102. A power supply apparatus 104 is connectable to the image capture apparatus 100 and supplies power to the image capture apparatus 100. A charging and power supply control unit 105 detects an apparatus connected to the image capture apparatus 100. The charging and power supply control unit 105 also performs, based on power supplied from the power supply apparatus 104, charging of the battery 102, supplying power to the power source control unit 103, or both.

In a case where a power button 106 is pressed when the power is not supplied to components of the image capture apparatus 100, the power source control unit 103 performs control to start power supply to the components of the image capture apparatus 100, and the system control unit 101 performs a start-up process of the image capture apparatus 100. In a case where the power button 106 is pressed when the power is supplied to components of the image capture apparatus 100, the power source control unit 103 performs control to stop the power supply to the components of the image capture apparatus 100, and the system control unit 101 performs a shutdown process of the image capture apparatus 100.

A voltage detecting unit 108 detects a voltage of the battery 102. The power source control unit 103 monitors the voltage of the battery 102 detected by the voltage detecting unit 108. When the voltage detecting unit 108 detects that the voltage of the battery 102 becomes less than or equal to a predetermined voltage, the power source control unit 103 instructs the system control unit 101 to perform the shutdown process. In response thereto, the system control unit 101 performs the shutdown process of the image capture apparatus 100.

A dummy load unit 107 connects a dummy load to the battery 102, thereby serving as a constant-current load circuit for the battery 102. In a case where a circuit consuming a large current is operated in the image capture apparatus 100, it is necessary to avoid the operation of the circuit from becoming unstable due to shortage of the power in the middle of the operation. Therefore, the dummy load unit 107 connects, to the battery 102, the dummy load of the constant-current load circuit previously set to a predetermined value. The voltage detecting unit 108 detects voltage drop of the battery 102 caused by the dummy load. The system control unit 101 estimates, by the equation below, a value of the voltage drop in the case where the circuit consuming a large current is operated, from the value of the voltage drop caused by the dummy load and a load test coefficient:

(voltage drop)=(voltage drop caused by dummy load)×(load test coefficient)

The load test coefficient is determined based on how many times larger the power consumed in a case where the circuit consuming a large current is operated is than the power consumed by the dummy load. The load test coefficient is provided for each operation pattern in which large power is consumed and is stored in an internal memory 122.

A shutter 109 includes an aperture function. A shutter driving unit 110 drives the shutter 109. A zoom lens 111 can change an angle of field and magnification. A lens driving unit 112 drives the zoom lens 111. The shutter driving unit 110 and the lens driving unit 112 are operated by power supplied from the power source control unit 103. A light emission unit 113 is a supplemental light source used during image capturing, and includes a light amount control function. A light emission control unit 114 controls light to be emitted from the light emission unit 113. The light emission unit 113 and the light emission control unit 114 are operated by power supplied from the power source control unit 103.

An image capture unit 115 includes an image sensor 116, and converts an optical image into an electric signal. An image processing unit 117 performs an analog signal process, such as a pixel interpolation process and a color conversion process, on a signal output from the image capture unit 115. The image processing unit 117 also performs a predetermined calculation process on the signal output from the image capture unit 115. The system control unit 101 performs, based on a result of the calculation process, an exposure control, a ranging control, a light emission control, an autofocusing (AF) process, an automatic exposure (AE) process, and an electronic flash preliminary emission (pre-flash) process. A timing signal generating unit 118 generates signals to operate the image capture unit 115 and the image processing unit 117.

The image processing unit 117 converts the signal generated by the image capture unit 115 from an analog signal into a digital signal to generate still image data or moving image data. The system control unit 101 stores, in an external memory 119, the still image data or the moving image data generated by the image processing unit 117. The external memory 119 includes a storage capacity sufficient to store a predetermined number of still images or a moving image and sound for a predetermined time. The external memory 119 is detachable from the image capture apparatus 100. The system control unit 101 superimposes predetermined information on the still image data or the moving image data stored by the external memory 119 as necessary, and supplies resultant data to a display unit 120. The display unit 120 includes, for example, a liquid crystal display panel or an organic electroluminescence (EL) panel, and displays the still image data or the moving image data supplied from the system control unit 101.

A request from a user (e.g., request to image still image or moving image) is input from a user interface (UI) unit 121 to the system control unit 101. The request to capture a still image or a moving image is input from the UI unit 121 to the system control unit 101. In a case where the request to image a still image is input to the system control unit 101, the image processing unit 117 converts the signal generated by the image capture unit 115 from an analog signal into a digital signal to generate still image data. The system control unit 101 stores the still image data in the external memory 119 and supplies the still image data to the display unit 120.

In a case where the request to image a moving image is input to the system control unit 101, the image processing unit 117 converts the signal generated by the image capture unit 115 from an analog signal into a digital signal, thereby generating moving image data. The system control unit 101 stores the moving image data in the external memory 119 or supplies the moving image data to the display unit 120.

The internal memory 122 stores a constant, a variable, a program, etc. for operation of the system control unit 101, and also stores a table 123. The table 123 indicates a correspondence relationship between operating modes and load test coefficients, power consumptions, or necessary battery capacities.

Figure 2:
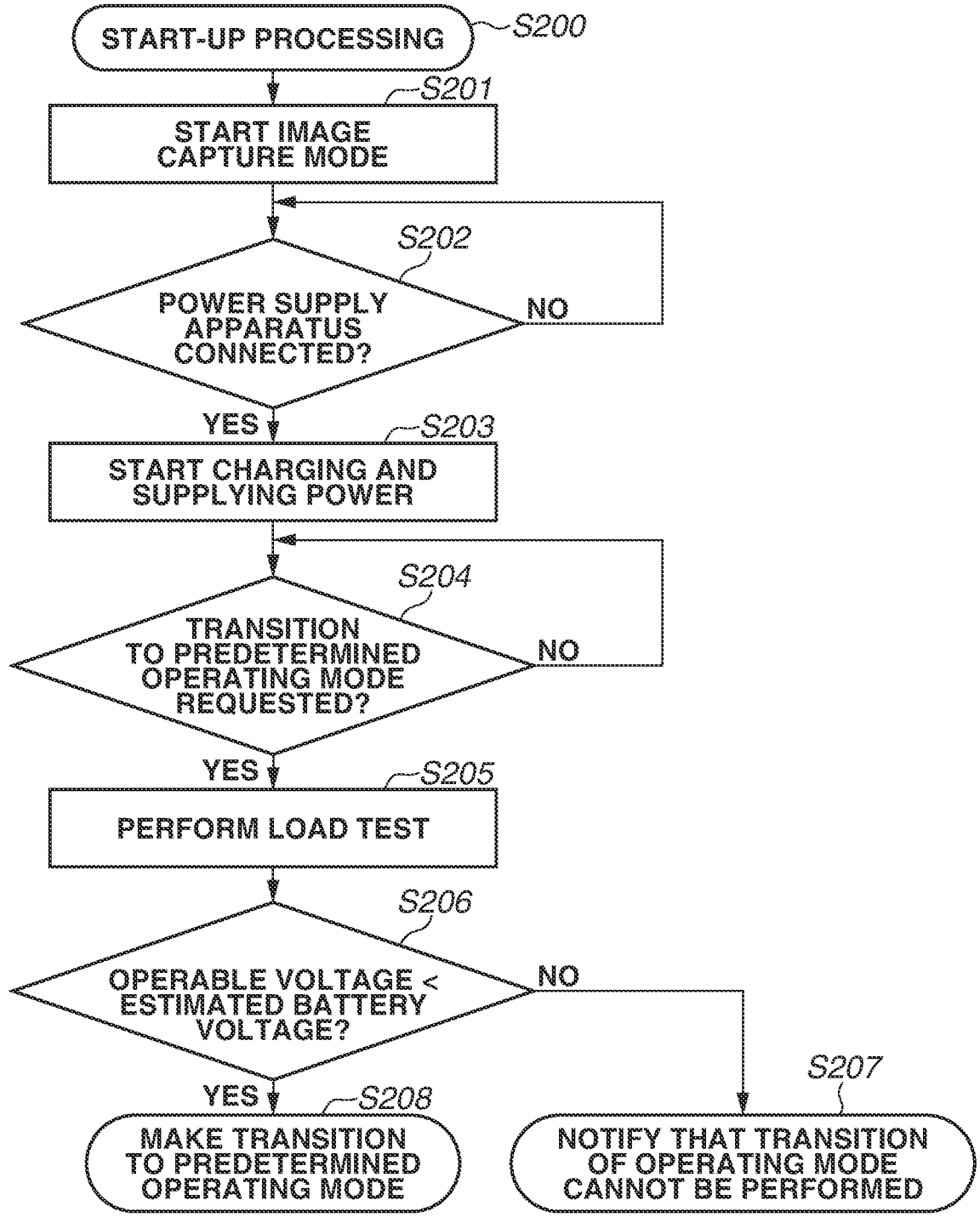
FIG. 2 is a flowchart illustrating an example of an operation performed by the image capture apparatus.

FIG. 2 is a flowchart illustrating an example of an operation performed by the image capture apparatus 100 according to the first exemplary embodiment. When the image capture apparatus 100 transitions from the current operating mode to a predetermined operating mode while the battery 102 is charged, the image capture apparatus 100 stops charging the battery 102, detects the voltage of the battery 102, performs a load test in the predetermined operating mode, and determines whether the image capture apparatus 100 is operable in the predetermined operating mode.

In step S200, the battery 102 is connected to the image capture apparatus 100. When the power button 106 is pressed, the power source control unit 103 supplies the power to components of the image capture apparatus 100. The system control unit 101 then performs the start-up process of the image capture apparatus 100.

In step S201, the image capture apparatus 100 starts up in an image capture mode (e.g., a still image capture mode).

In step S202, the charging and power supply control unit 105 waits until a power supply apparatus 104 that can perform charging is connected to the image capture apparatus 100 (NO in step S202). In a case where the power supply apparatus 104 is connected to the image capture apparatus 100 (YES in step S202), the power supply apparatus 104 can supply power to the image capture apparatus 100, and the process proceeds to step S203.

In step S203, the charging and power supply control unit 105 starts charging the battery 102 with power supplied from the power supply apparatus 104, and supplying power from the power supply apparatus 104 to the power source control unit 103. The power source control unit 103 then starts supplying power from the power supply apparatus 104 to the components of the image capture apparatus 100.

In step S204, the system control unit 101 waits until a transition request for transitioning from the current operating mode to a predetermined operating mode is input from the UI unit 121 (NO in step S204). In a case where the transition request for transitioning to the predetermined operating mode is input from the UI unit 121 (YES in step S204), the process proceeds to step S205.

In step S205, the system control unit 101 performs a load test.

Figure 3:
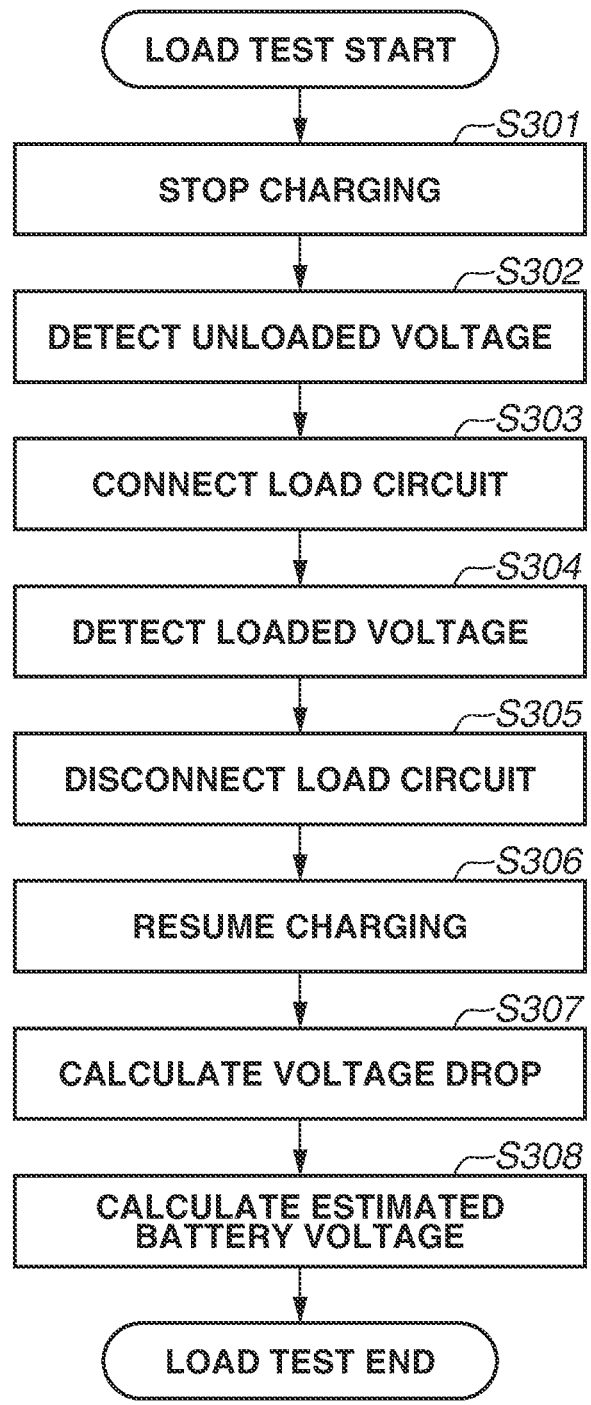
FIG. 3 is a flowchart illustrating a load test.

FIG. 3 is a flowchart illustrating the load test. In step S301, the charging and power supply control unit 105 stops charging the battery 102 with power supplied from the power supply apparatus 104.

In step S302, the charging and power supply control unit 105 does not supply a charging voltage to the battery 102, and the dummy load unit 107 does not connect the constant-current load circuit to the battery 102. The battery 102 is put into a state where the charging from the power supply apparatus 104 is stopped and the load circuit is not connected. In this state of the battery 102, the voltage detecting unit 108 detects an unloaded voltage of the battery 102.

In step S303, the dummy load unit 107 connects the constant-current load circuit to the battery 102. The battery 102 is put into a state where the charging from the power supply apparatus 104 is stopped and the load circuit is connected.

In step S304, the voltage detecting unit 108 detects a loaded voltage of the battery 102 in the foregoing state of the battery 102.

In step S305, the dummy load unit 107 disconnects the load circuit from the battery 102.

In step S306, the charging and power supply control unit 105 resumes charging the battery 102 with power supplied from the power supply apparatus 104.

In step S307, the system control unit 101 acquires the unloaded voltage detected in step S302 and the loaded voltage detected in step S304. The system control unit 101 then reads the load test coefficient corresponding to the predetermined operating mode from the table 123 stored in the internal memory 122 as illustrated in FIG. 4. The system control unit 101 then subtracts the loaded voltage from the unloaded voltage as illustrated by the equation below to obtain the value of "(voltage drop caused by dummy load)". The system control unit 101 then multiplies the obtained value of "(voltage drop caused by dummy load)" by the load test coefficient as illustrated by the equation below to obtain an estimated voltage drop in the predetermined operating mode:

(estimated voltage drop)={(unloaded voltage)−(loaded voltage)}×(load test coefficient)=(voltage drop caused by dummy load)×(load test coefficient)

As described above, the system control unit 101 multiplies a difference between the unloaded voltage and the loaded voltage by the load test coefficient to obtain a result of the multiplication as the estimated voltage drop.

FIG. 4 is a diagram illustrating a configuration example of the table 123. The table 123 indicates a correspondence relationship between operating modes and load test coefficients. For example, items of the load test include a still image capture process, a read process of the image sensor 116, a lens driving process, a light emission process of the light emission unit 113, a display process of the display unit 120, a moving image capture process, and a communication process.

Returning to the flowchart of FIG. 3, in step S308, the system control unit 101 subtracts the estimated voltage drop obtained in step S307 from the unloaded voltage detected in step S302 based on the equation below, thereby obtaining an estimated battery voltage of the battery 102 in the predetermined operating mode:

(estimated battery voltage)=(unloaded voltage)−(estimated voltage drop)

As described above, the system control unit 101 acquires the difference between the unloaded voltage and the estimated voltage drop as the estimated battery voltage.

Returning to the flowchart of FIG. 2, in step S206, the system control unit 101 functions as a determining unit and determines whether the image capture apparatus 100 is operable in the predetermined operating mode, based on the estimated battery voltage obtained in step S308. For example, the system control unit 101 compares the estimated battery voltage obtained in step S308 with an operable voltage (threshold) stored in the internal memory 122. In a case where the estimated battery voltage is greater than the operable voltage (YES in step S206), the image capture apparatus 100 is operable in the predetermined operating mode, and the process proceeds to step S208. In a case where the estimated battery voltage is less than or equal to the operable voltage (NO in step S206), the image capture apparatus 100 is not operable in the predetermined operating mode, and the process proceeds to step S207.

In step S208, the system control unit 101 transitions from the current operating mode to the predetermined operating mode based on the transition request input in step S204.

In step S207, the system control unit 101 does not transition to the predetermined operating mode, but rather notifies that the transition from the current operating mode to the predetermined operating mode cannot be performed. For example, the system control unit 101 displays, on the display unit 120, a message indicating that the transition of the operating mode cannot be performed.

In the first exemplary embodiment, when the image capture apparatus 100 transitions to the predetermined operating mode, the image capture apparatus 100 stops charging the battery 102, detects the voltage of the battery 102, and performs the load test in the predetermined operating mode, thereby determining whether the image capture apparatus 100 is operable in the predetermined operating mode. Since the image capture apparatus 100 detects the voltage of the battery 102 while the charging of the battery 102 is stopped, it is possible to accurately detect the voltage, and thus improve estimation accuracy of the voltage of the battery 102 in the predetermined operating mode.

Figure 5:
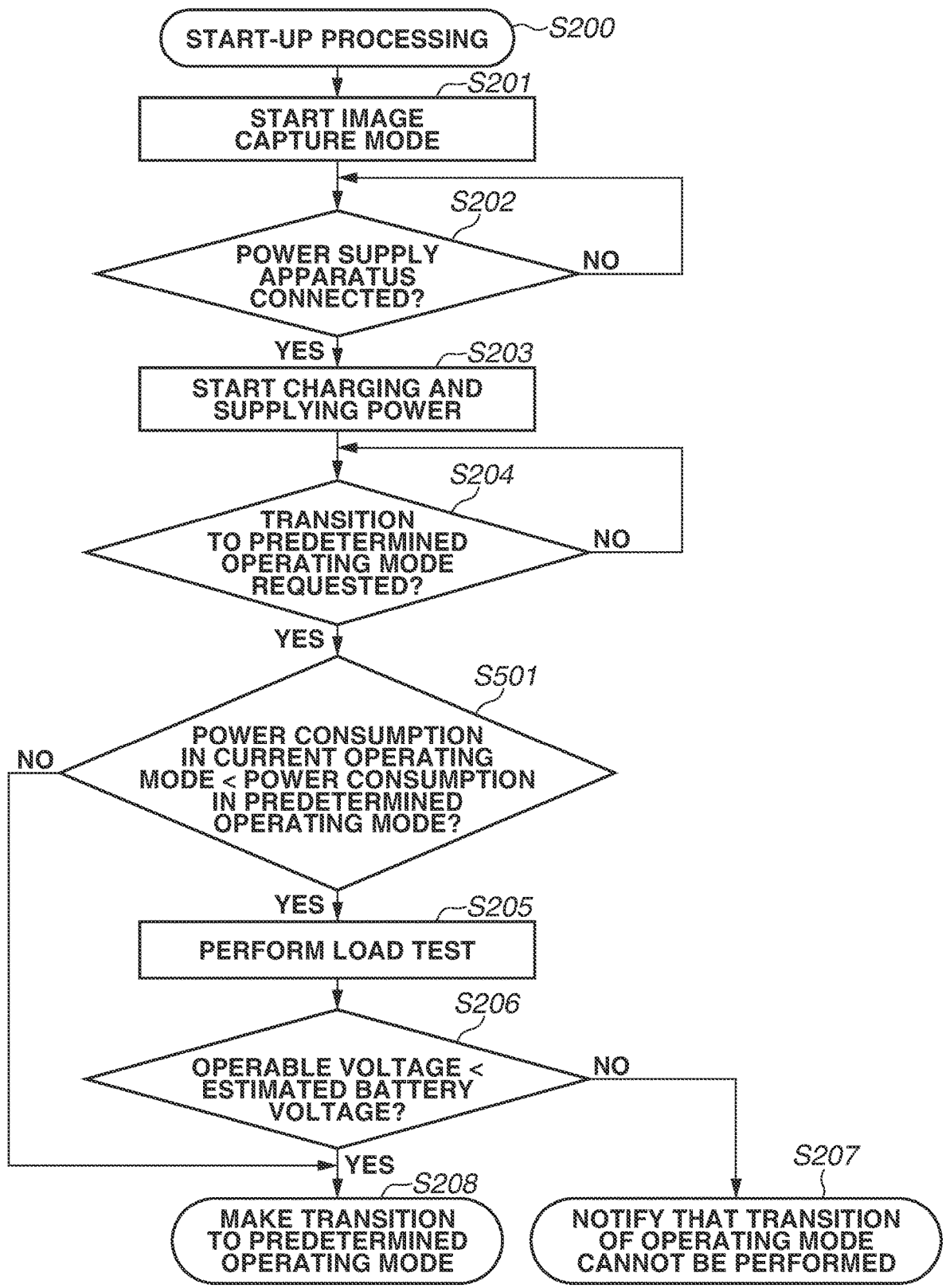
FIG. 5 is a flowchart illustrating an example of an operation performed by the image capture apparatus.

FIG. 5 is a flowchart illustrating an example of an operation performed by an image capture apparatus 100 according to a second exemplary embodiment. The flowchart of FIG. 5 is the same as the flowchart illustrated in FIG. 2 except step S501 added in the flowchart of FIG. 2. Differences between the second exemplary embodiment and the first exemplary embodiment are described below. When the image capture apparatus 100 transitions to the predetermined operating mode, the image capture apparatus 100 compares power consumption in the current operating mode with power consumption in the predetermined operating mode. Only in the case where the power consumption in the predetermined operating mode is greater than the power consumption in the current operating mode, the image capture apparatus 100 stops charging the battery 102, detects the voltage of the battery 102, performs the load test in the predetermined operating mode, and, as a result, determines whether the image capture apparatus 100 is operable in the predetermined operating mode.

The image capture apparatus 100 performs the processes in step S200 to S204 in a manner similar to the first exemplary embodiment. In step S204, in the case where the transition request for transitioning to the predetermined operating mode is input (YES in step S204), the process proceeds to step S501.

In step S501, the system control unit 101 refers to the table 123 stored in the internal memory 122 and acquires the power consumption in the predetermined operating mode and the power consumption in the current operating mode. The table 123 illustrated in FIG. 4 indicates the correspondence relationship between the operating modes and the load test coefficients. The table 123 illustrated in FIG. 6 indicates the correspondence relationship between the operating modes and the power consumptions.

In a case where the power consumption in the predetermined operating mode is greater than the power consumption in the current operating mode (YES in step S501), the process proceeds to step S205, and the system control unit 101 performs the processes in steps S205 to S208 in a manner similar to the first exemplary embodiment. For example, in a case where the image capture apparatus 100 transitions from a still image capture mode to a moving image capture mode, the power consumption in the moving image capture mode is greater than the power consumption in the still image capture mode as illustrated in FIG. 6, and thus the process proceeds to step S205.

In a case where the power consumption in the predetermined operating mode is less than or equal to the power consumption in the current operating mode (NO in step S501), the system control unit 101 does not perform the load test in step S205, and the process proceeds to step S208. For example, in a case where the image capture apparatus 100 transitions from the still image capture mode to a reproduction mode, the power consumption in the reproduction mode is less than or equal to the power consumption in the still image capture mode as illustrated in FIG. 6. The system control unit 101, thus, does not perform the load test in step S205, and the process proceeds to step S208. In step S208, the system control unit 101 transitions to the predetermined operating mode based on the transition request input in step S204.

In the second exemplary embodiment, when the image capture apparatus 100 transitions to the predetermined operating mode, the image capture apparatus 100 compares the power consumption in the current operating mode with the power consumption in the predetermined operating mode. Only in the case where the power consumption in the predetermined operating mode is greater than the power consumption in the current operating mode, the image capture apparatus 100 stops charging the battery 102, detects the voltage of the battery 102, performs the load test in the predetermined operating mode, and, as a result, determines whether the image capture apparatus 100 is operable in the predetermined operating mode.

While the image capture apparatus 100 transitions to the predetermined operating mode at start-up of the image capture mode in the first and second exemplary embodiments, the image capture apparatus 100 can transition to the predetermined operating mode at start-up of another operating mode other than the image capture mode. Whereas the image capture apparatus 100 calculates the estimated battery voltage of the battery 102 in the predetermined operating mode by the calculation method in FIG. 3, other calculation methods can also be used.

Figure 7:
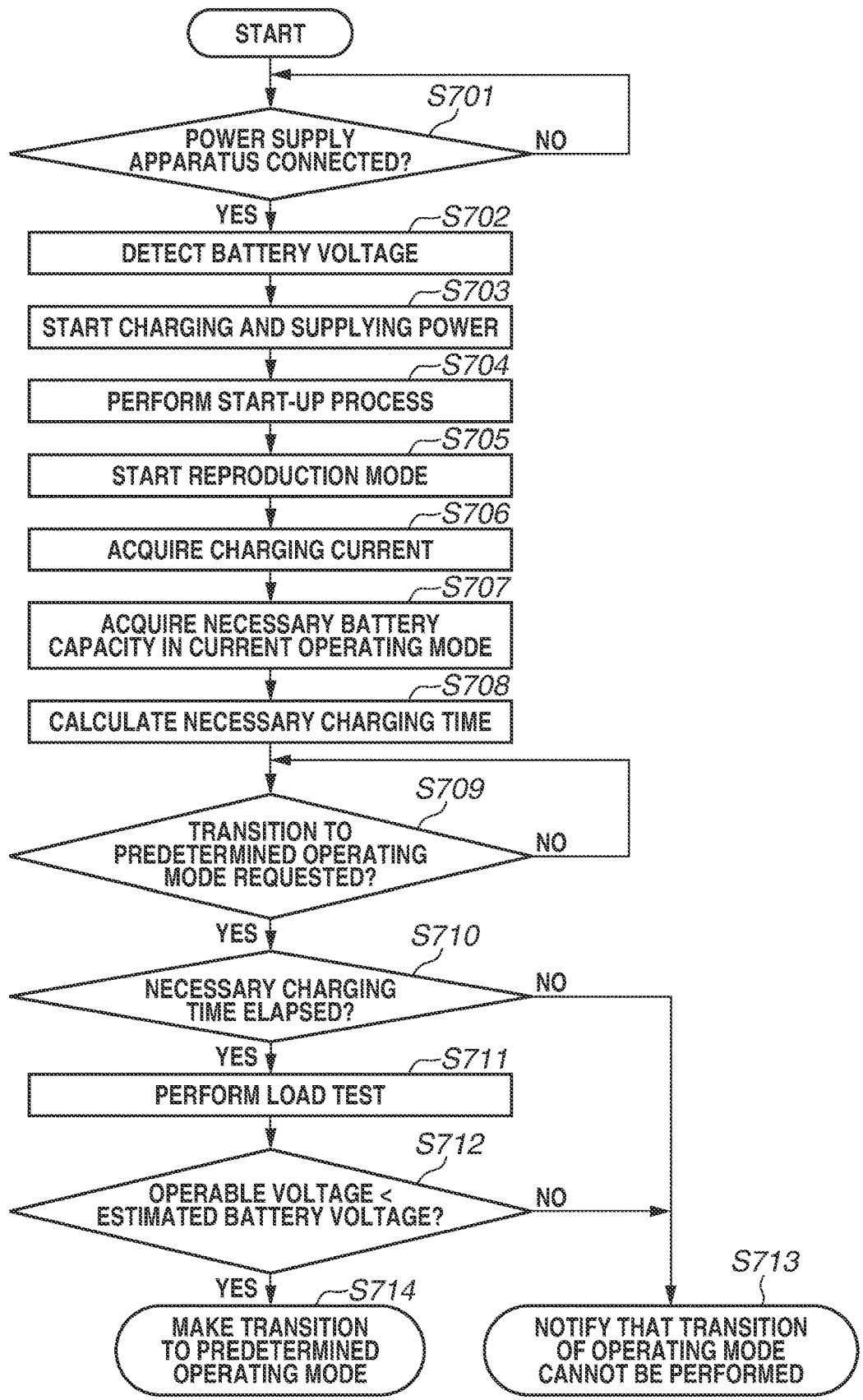
FIG. 7 is a flowchart illustrating an example of an operation performed by the image capture apparatus.

FIG. 7 is a flowchart illustrating an example of an operation performed by an image capture apparatus 100 according to a third exemplary embodiment. Aspects of the third exemplary embodiment that differ from those of the first exemplary embodiment are described below. When the image capture apparatus 100 transitions to the predetermined operating mode, the image capture apparatus 100 determines whether the operation is continuable even if supplying power from the power supply apparatus 104 to components of the image capture apparatus 100 stops. In a case where the operation is continuable, the image capture apparatus 100 stops charging the battery 102 and supplying power to the components of the image capture apparatus 100, detects the voltage of the battery 102, performs load test to the predetermined operating mode, and, as a result, determines whether the image capture apparatus 100 is operable in the predetermined operating mode.

In step S701, the battery 102 is connected to the image capture apparatus 100, and the charging and power supply control unit 105 waits until the power supply apparatus 104 that can perform charging is connected to the image capture apparatus 100 (NO in step S701). In a case where the power supply apparatus 104 is connected to the image capture apparatus 100 (YES in step S701), the power supply apparatus 104 can supply power to the image capture apparatus 100, and the process proceeds to step S702.

In step S702, the voltage detecting unit 108 detects the voltage of the battery 102.

In step S703, the charging and power supply control unit 105 starts charging the battery 102 with power supplied from the power supply and supplying power to the power source control unit 103 from the power supply apparatus 104. The power source control unit 103 then starts supplying power to components of the image capture apparatus 100 from the power supply apparatus 104.

In step S704, the system control unit 101 performs a start-up process of the image capture apparatus 100.

In step S705, the image capture apparatus 100 is started up in the reproduction mode.

In step S706, the charging and power supply control unit 105 detects a charging current [mA] of the battery 102. The system control unit 101 acquires the charging current [mA] detected by the charging and power supply control unit 105.

FIG. 8 is a diagram illustrating the table 123 indicating a correspondence relationship between operating modes and necessary battery capacities [mAh]. As described above, the table 123 illustrated in FIG. 4 indicates the correspondence relationship between the operating modes and the load test coefficients in FIG. 4. In step S707, the system control unit 101 refers to the table 123 of FIG. 8 and acquires a battery capacity [mAh] necessary for operating in the current operating mode.

In step S708, the system control unit 101 calculates a charging time necessary to charge the battery 102 until the capacity thereof reaches the level necessary for operating in the current operating mode, based on the charging current value [mA] acquired in step S706 and the necessary battery capacity [mAh] acquired in step S707.

In step S709, the system control unit 101 waits until the transition request from the current operating mode to the predetermined operating mode is input from the UI unit 121 (NO in step S709). In a case where the transition request for transitioning to the predetermined operating mode is input from the UI unit 121 (YES in step S709), the process proceeds to step S710.

In step S710, the system control unit 101 determines whether the charging time of the battery 102 exceeds the necessary charging time calculated in step S708. For example, the system control unit 101 compares the charging time of the battery 102 with the necessary charging time calculated in step S708. In a case where the charging time of the battery 102 is greater than or equal to the necessary charging time, the charging time of the battery 102 exceeds the necessary charging time (YES in step S710). The process then proceeds to step S711. In a case where the charging time of the battery 102 is less than the necessary charging time, the charging time of the battery 102 does not exceed the necessary charging time (NO in step S710). The process then proceeds to step S713.

In step S711, the system control unit 101 performs a load test illustrated in FIG. 9. FIG. 9 is a flowchart illustrating the load test. FIG. 9 differs from FIG. 3 in that steps S901 and S906 are provided in FIG. 9 in place of steps S301 and S306 of FIG. 3, respectively. Aspects of the processes in FIG. 9 that differ from those of the processes in FIG. 3 are described below.

In step S901, the charging and power supply control unit 105 stops charging the battery 102 with power supplied from the power supply apparatus 104, and supplying power from the power supply apparatus 104 to the components of the image capture apparatus 100.

In step S302, the voltage detecting unit 108 detects the unloaded voltage of the battery 102 in a state where charging the battery 102 with power supplied from the power supply apparatus 104 and supplying power from the power supply apparatus 104 to the components of the image capture apparatus 100 are stopped and the load circuit is not connected to the battery 102.

In step S304, the voltage detecting unit 108 detects the loaded voltage of the battery 102 in a state where charging the battery 102 with power supplied from the power supply apparatus 104 and supplying power from the power supply apparatus 104 to the components of the image capture apparatus 100 are stopped and the load circuit is connected to the battery 102.

In step S906, the charging and power supply control unit 105 resumes charging the battery 102 with power supplied from the power supply apparatus 104, and supplying power to the components of the image capture apparatus 100 from the power supply apparatus 104.

Returning to the flowchart of FIG. 7, in step S712, the system control unit 101 determines whether the image capture apparatus 100 is operable in the predetermined operating mode, based on the estimated battery voltage obtained in step S308 of FIG. 9. For example, the system control unit 101 compares the estimated battery voltage obtained in step S308 of FIG. 9 with the operable voltage (threshold) stored in the internal memory 122. In a case where the estimated battery voltage is greater than the operable voltage (YES in step S712), the image capture apparatus 100 is operable in the predetermined operating mode. The process then proceeds to step S714. In a case where the estimated battery voltage is less than or equal to the operable voltage (NO in step S712), the image capture apparatus 100 is not operable in the predetermined operating mode. The process then proceeds to step S713.

In step S714, the system control unit 101 transitions from the current operating mode to the predetermined operating mode based on the transition request in step S709.

In step S713, the system control unit 101 does not transition to the predetermined operating mode and notifies that the transition from the current operating mode to the predetermined operating mode cannot be performed. For example, the system control unit 101 displays, on the display unit 120, that the transition of the operating mode cannot be performed.

In the third exemplary embodiment, when the image capture apparatus 100 transitions to the predetermined operating mode, the image capture apparatus 100 determines whether the operation is continuable even if supplying power from the power supply apparatus 104 to components of the image capture apparatus 100 stops. In a case where the operation is continuable, the image capture apparatus 100 stops charging the battery 102 and supplying power to the components of the image capture apparatus 100, detects the voltage of the battery 102, performs the load test in the predetermined operating mode, and determines whether the image capture apparatus 100 is operable in the predetermined operating mode. Since the image capture apparatus 100 detects the voltage of the battery 102 in a state where charging the battery 102 and supplying power to the components of the image capture apparatus 100 are stopped, it is possible to accurately detect the voltage and to improve estimation accuracy of the voltage of the battery 102 in the predetermined operating mode.

FIG. 10 is a flowchart illustrating an example of an operation performed by the image capture apparatus 100 according to a fourth exemplary embodiment. The flowchart of FIG. 10 is the same as the flowchart illustrated in FIG. 7 except step S1001 is added in the flowchart of FIG. 7. Aspects of the fourth exemplary embodiment that differ from those of the third exemplary embodiment are described below. When the image capture apparatus 100 transitions to the predetermined operating mode, the image capture apparatus 100 determines whether the operation is continuable even if supplying power from the power supply apparatus 104 to components of the image capture apparatus 100 stops. In a case where the operation is continuable, the image capture apparatus 100 compares the power consumption in the current operating mode with the power consumption in the predetermined operating mode. Only in the case where the power consumption in the predetermined operating mode is greater than the power consumption in the current operating mode, the image capture apparatus 100 stops charging the battery 102 and supplying power to the components of the image capture apparatus 100, detects the voltage of the battery 102, and performs the load test in the predetermined operating mode. The image capture apparatus 100 then determines whether the image capture apparatus 100 is operable in the predetermined operating mode.

The image capture apparatus 100 performs the processes in steps S701 to S710 in a similar manner to the third exemplary embodiment. In step S710, in the case where the charging time of the battery 102 exceeds the necessary charging time (YES in step S710), the process proceeds to step S1001.

In step S1001, the system control unit 101 refers to the table 123 of FIG. 6 and acquires the power consumption in the predetermined operating mode and the power consumption in the current operating mode. The tables 123 illustrated in FIGS. 4 and 6 indicate the correspondence relationship between the operating modes and the load test coefficients and the correspondence relationship between the operating modes and the power consumptions, respectively. As previously described, the table 123 illustrated in FIG. 8 indicates the correspondence relationship between the operating modes and the necessary battery capacities.

In the case where the power consumption in the predetermined operating mode is greater than the power consumption in the current operating mode (YES in step S1001), the process proceeds to step S711, and the system control unit 101 performs the processes in steps S711 to S714 in a similar manner to the third exemplary embodiment. For example, in a case where the image capture apparatus 100 transitions from the reproduction mode to the still image capture mode, the process proceeds to step S711 since the power consumption in the still image capture mode is greater than the power consumption in the reproduction mode as illustrated in FIG. 6.

In a case where the power consumption in the predetermined operating mode is less than or equal to the power consumption in the current operating mode (NO in step S1001), the system control unit 101 does not perform the load test in step S711, and the process proceeds to step S714. In step S714, the system control unit 101 transitions to the predetermined operating mode based on the transition request in step S709.

In the fourth exemplary embodiment, when the image capture apparatus 100 transitions to the predetermined operating mode, the image capture apparatus 100 determines whether the operation is continuable even if supplying power from the power supply apparatus 104 to components of the image capture apparatus 100 stops. In the case where the operation is continuable, the image capture apparatus 100 compares the power consumption in the current operating mode with the power consumption in the predetermined operating mode. Only in the case where the power consumption in the predetermined operating mode is greater than the power consumption in the current operating mode, the image capture apparatus 100 stops charging the battery 102 and supplying power to the components of the image capture apparatus 100, detects the voltage of the battery 102, and performs the load test in the predetermined operating mode. The image capture apparatus 100 then determines whether the image capture apparatus 100 is operable in the predetermined operating mode.

While the image capture apparatus 100 transitions to the predetermined operating mode at start-up of the reproduction mode in the third and fourth exemplary embodiments, the image capture apparatus 100 can transition to the predetermined operating mode at start-up of another operating mode instead of the reproduction mode. The image capture apparatus 100 calculates the estimated battery voltage of the battery 102 in the predetermined operating mode by the calculation method illustrated in FIG. 9. Other calculation methods, however, can also be used.

At least one of various functions, processes, and methods described in the first to fourth exemplary embodiments is achievable by a program. In a fifth exemplary embodiment described below, the program to achieve the at least one of various functions, processes, and methods described in the first to fourth exemplary embodiments is referred to as a "program X". Further, in the fifth exemplary embodiment, a computer that executes the program X is referred to as "computer Y". A personal computer, a microcomputer, a central processing unit (CPU), etc. are examples of the computer Y.

The at least one of various functions, processes, and methods described in the first to fourth exemplary embodiments is achievable by causing the computer Y to execute the program X. In this case, the program X is supplied to the computer Y via a computer-readable storage medium. The computer-readable storage medium in the fifth exemplary embodiment includes at least one of a hard disk drive, a magnetic storage device, an optical storage device, a magnetooptical storage device, a memory card, a read-only memory (ROM), a random access memory (RAM), etc. Further, the computer-readable storage medium in the fifth exemplary embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2017-220072, filed Nov. 15, 2017, which is hereby incorporated by reference herein in its entirety.

What is claimed is:

1. An image capture apparatus comprising:
a charging control circuitry that stops charging a battery with power supplied from a power supply apparatus, in a case where a transition from a current operating mode to another operating mode is requested while the battery is being charged;
a voltage detecting circuitry that detects a first voltage of the battery and a second voltage of the battery, in a state where the charging of the battery is stopped, the first voltage and the second voltage being detected under different conditions; and
a determining circuitry that determines whether the image capture apparatus is operable in said another operating mode, based on the detected first voltage of the battery and the detected second voltage of the battery,
wherein the image capture apparatus transitions from the current operating mode to said another operating mode, in a case where it is determined that the image capture apparatus is operable in said another operating mode.

2. The image capture apparatus according to claim 1, wherein, in a case where the power supply apparatus is connected to the image capture apparatus, the charging control circuitry starts charging the battery with power supplied from the power supply apparatus.

3. The image capture apparatus according to claim 1, wherein, in a case where the power supply apparatus is connected to the image capture apparatus, the charging control circuitry starts charging the battery with power supplied from the power supply apparatus and supplying power from the power supply apparatus to components of the image capture apparatus.

4. The image capture apparatus according to claim 1, wherein the voltage detecting circuitry detects the first voltage of the battery in a case where a load is not connected to the battery and detects the second voltage of the battery in a case where the load is connected to the battery, in a state where the charging of the battery is stopped.

5. The image capture apparatus according to claim 1, wherein the charging control circuitry resumes charging the battery with power supplied from the power supply apparatus after the voltage detecting circuitry detects the first voltage of the battery and the second voltage of the battery.

6. The image capture apparatus according to claim 1,
wherein the charging control circuitry stops charging the battery with power supplied from the power supply apparatus and supplying power from the power supply apparatus to components of the image capture apparatus, and
wherein the voltage detecting circuitry detects the first voltage of the battery and the second voltage of the battery, in a state where charging the battery with power supplied from the power supply apparatus and supplying power from the power supply apparatus to the components of the image capture apparatus are stopped.

7. The image capture apparatus according to claim 1, wherein the image capture apparatus is able to act as a digital camera or a digital video camera.

8. The image capture apparatus according to claim 1, wherein the image capture apparatus is able to act as a smartphone or a tablet.

9. A method comprising:
causing a charging control circuitry of an image capture apparatus to stop charging a battery with power supplied from a power supply apparatus, in a case where a transition from a current operating mode to another operating mode is requested while the battery is being charged;
causing a voltage detecting circuitry of the image capture apparatus to detect a first voltage of the battery and a second voltage of the battery, in a state where the charging of the battery is stopped, the first voltage and the second voltage being detected under different conditions; and
causing a determining circuitry of the image capture apparatus to determine whether the image capture apparatus is operable in said another operating mode, based on the detected first voltage of the battery and the detected second voltage of the battery,
wherein the image capture apparatus transitions from the current operating mode to said another operating mode, in a case where it is determined that the image capture apparatus is operable in said another operating mode.

10. The method according to claim 9, further comprising:
causing the charging control circuitry to start charging the battery with power supplied from the power supply apparatus, in a case where the power supply apparatus is connected to the image capture apparatus.

11. The method according to claim 9, further comprising:
causing the charging control circuitry to start charging the battery with power supplied from the power supply apparatus and supplying power from the power supply apparatus to components of the image capture apparatus, in a case where the power supply apparatus is connected to the image capture apparatus.

12. The method according to claim 9,
wherein the voltage detecting circuitry detects the first voltage of the battery in a case where a load is not connected to the battery and detects the second voltage of the battery in a case where the load is connected to the battery, in a state where the charging of the battery is stopped.

13. The method according to claim 9, further comprising:
causing the charging control circuitry to resume charging the battery with power supplied from the power supply apparatus after the voltage detecting circuitry detects the first voltage of the battery and the second voltage of the battery.

14. The method according to claim 9,
wherein the charging control circuitry stops charging the battery with power supplied from the power supply apparatus and supplying power from the power supply apparatus to components of the image capture apparatus, and
wherein the voltage detecting circuitry detects the first voltage of the battery and the second voltage of the battery, in a state where charging the battery with power supplied from the power supply apparatus and supplying power from the power supply apparatus to the components of the image capture apparatus are stopped.

15. The method according to claim 9, wherein the image capture apparatus is able to act as a digital camera or a digital video camera.

16. The method according to claim 9, wherein the image capture apparatus is able to act as a smartphone or a tablet.

17. A non-transitory storage medium that stores a program causing a computer to execute a method, the method comprising:
causing a charging control circuitry of an image capture apparatus to stop charging a battery with power supplied from a power supply apparatus, in a case where a transition from a current operating mode to another operating mode is requested while the battery is being charged;
causing a voltage detecting circuitry of the image capture apparatus to detect a first voltage of the battery and a second voltage of the battery, in a state where the charging of the battery is stopped, the first voltage and the second voltage being detected under different conditions; and
causing a determining circuitry of the image capture apparatus to determine whether the image capture apparatus is operable in said another operating mode, based on the detected first voltage of the battery and the detected second voltage of the battery,
wherein the image capture apparatus transitions from the current operating mode to said another operating mode, in a case where it is determined that the image capture apparatus is operable in said another operating mode.

\* \* \* \* \*